(12) United States Patent
Hachmann et al.

(10) Patent No.: US 6,250,232 B1
(45) Date of Patent: Jun. 26, 2001

(54) RUNNING GEAR FOR A RAIL VEHICLE

(75) Inventors: Ulrich Hachmann, Pyrbaum; Alexander Horoschenkoff; Stefan Emmerling, both of Taufkirchen; Christian Mauritz, Leinfelden, all of (DE)

(73) Assignee: ABB Daimler-Benz Transportation (Technology) GmbH (DE)

( * ) Notice: Subject to any disclaimer, the term of this patent is extended or adjusted under 35 U.S.C. 154(b) by 0 days.

(21) Appl. No.: 09/147,909

(22) PCT Filed: Jun. 8, 1998

(86) PCT No.: PCT/EP98/03414

§ 371 Date: May 26, 1999

§ 102(e) Date: May 26, 1999

(87) PCT Pub. No.: WO99/05014

PCT Pub. Date: Feb. 4, 1999

(30) Foreign Application Priority Data

Jul. 24, 1997 (DE) .............................................. 197 31 867

(51) Int. Cl.$^7$ ...................................................... B61F 3/00
(52) U.S. Cl. .................................. 105/197.05; 105/157.1; 105/167; 105/182.1; 105/197.1; 105/198.2; 105/198.7
(58) Field of Search .............................. 105/157.1, 158.2, 105/167, 182.1, 197.05, 197.1, 198.2, 198.7; 295/36.1, 37, 38, 39, 49

(56) References Cited

U.S. PATENT DOCUMENTS

| | | | |
|---|---|---|---|
| 3,869,180 | * | 3/1975 | Sonnerat ............................... 308/180 |
| 4,448,131 | * | 5/1984 | Weiland et al. .................. 105/182 R |
| 4,723,491 | * | 2/1988 | Von Madeyski et al. ........ 105/198.7 |
| 5,123,358 | * | 6/1992 | Kemppainen et al. ............... 105/167 |

FOREIGN PATENT DOCUMENTS

| | | | |
|---|---|---|---|
| 2952182A1 | | 7/1981 | (DE) . |
| 3612797 | | 8/1987 | (DE) . |
| 4241300 | | 6/1994 | (DE) . |
| 0363573 | | 4/1990 | (EP) . |
| 0547010 | | 6/1993 | (EP) . |
| 1576388 | * | 7/1990 | (GB) ................ B16F/3/02 |
| 004221544 A1 | * | 1/1994 | (GB) ................ B61F/5/00 |
| 0248009 | * | 5/1926 | (IT) ................... 105/197.05 |
| 547010A1 | * | 6/1993 | (IT) ................... B61F/5/52 |

* cited by examiner

Primary Examiner—S. Joseph Morano
Assistant Examiner—Frantz F. Jules
(74) Attorney, Agent, or Firm—Webb Ziesenheim Logsdon Orkin & Hanson, P.C.

(57) ABSTRACT

A running gear for a rail vehicle having sprung longitudinal members of plastic, connected to one another by means of a cross-member structure and at their free ends to axle-boxes for rail wheels. In order to obtain optimal stability of the wheelset guidance with reduced loading of the sprung longitudinal members, the longitudinal members each has at least two flexural springs between the ends of which in each case an axle-box is fixed in symmetrical arrangement.

21 Claims, 3 Drawing Sheets

RUNNING GEAR FOR A RAIL VEHICLE

BACKGROUND OF THE INVENTION

1. Field of the Invention

The invention relates to a running gear for a rail vehicle, in particular a bogie.

2. Brief Description of the Prior Art

In the case of a known running gear of this kind, DE 29 52 182 A1 the running gear frame is constructed as an integral component of longitudinal members and cross-members is made of elastic fibre-reinforced material. The longitudinal members have an arm which simultaneously forms the primary suspension, while having its free end linked to an axle-box. A disadvantage of this design is that the respectively-assigned wheels or wheelsets are not guided with the necessary reliability. Due to the eccentric initiation of forces, additional moments occur in the flexural springs.

SUMMARY OF THE INVENTION

The invention is based on the problem of taking measures relating to a running gear for a rail vehicle, preferably a bogie, by means of which a loading of flexural springs commensurate with their function is achieved, combined with enhanced quality of ride.

In a running gear design according to the invention, due to a reduced overall loading of the individual flexural springs, the arrangement of two, or if necessary even more fibre-reinforced plastic flexural springs on each axle-box, gives the primary suspension between the rail wheels and the running gear frame a markedly increased stiffness range. Additional suspension elements can thereby be avoided. Moreover, due to the central location of the individual axle-boxes between the associated ends of the flexural springs, force initiation is largely moment-free, thus providing considerable benefits in terms of ride comfort and for the loading of the flexural springs themselves. The provision of several flexural springs per axle-box creates redundancy in respect of the linking of the axle-box case to the flexural springs, the wheelset guidance, and the linking of the flexural springs to the cross-member structure. The running gear frame thus takes on the task of primary suspension in addition to that of wheelset guidance.

To obtain an optimal spring characteristic, the flexural springs may in the unloaded state swing out in an S-shape from the cross-member structure down to the wheelsets. Additionally, in order to minimize overall width, the flexural springs may be mounted one above the other. It is also possible for four flexural springs to be mounted above one another for each longitudinal member of the bogie frame, in each case with two ends of the flexural springs engaging beneath an assigned axle-box, and the two further associated ends of this flexural spring assembly overlapping the axle-box concerned. By this means a symmetrical transfer of force between axle-box and running gear frame is achieved. At the same time a free gap is preferably left between the individual flexural springs so that, under normal operating conditions, the individual flexural springs assigned to an axle-box are not in frictional contact with one another. Here the individual flexural springs are rigidly linked to one another in the area of the cross-member structure, preferably forming a modular unit with the cross-member structure or being connected in one-piece to a central cross-member. The respective associated ends of the flexural spring assembly may be mounted, pivoted and flexible in shear, on or in the associated axle-box case, so that they can transmit damped impacts and vibrations occurring in the direction of running, via the flexural springs which are relatively stiff in the longitudinal direction, to the running gear frame. If on the other hand the longitudinal elasticity of the flexural springs is adequate, then they may also be fixed rigidly to the respective associated axle-box case. It may however also be expedient to couple the ends of the flexural springs to the housing of the associated axle-box by means of pivot pins, elastically guided where applicable and with axes running parallel to the axle. This produces a deflection curve which corresponds to cantilever beam bending. The flexural springs are not then loaded to the extent of buckling or bending at their ends. At the same time the wheelsets may also be guided in transversely-elastic axle-boxes, to allow the absorption of lateral oscillations and to allow a certain radial adjustment of the wheelsets. In addition, damper elements may be incorporated in the flexural springs, to dissipate vibration energy. These damper compression elements may be inserted between the axle-boxes, the flexural springs and the cross-member structure of the running gear frame, and rest on these elements with force-coupling. The cross-member structure may be formed by a cross-member connecting the longitudinal members and an additional frame reinforcing element. This frame reinforcing element is located centrally on the running gear frame and is in particular fixed to the longitudinal members. On the plate-shaped frame reinforcing element, a bogie pivot assembly may be provided to connect the running gear to a vehicle body mounted above it. In particular the frame reinforcing element may support fixed brake calipers of disc brakes, which have brake discs fixed to the axles rotating with the rail wheels. At the same time a slip coupling may be inserted in the axle of one or more wheelsets, to give the wheelset at least to a large extent the running characteristics of a pair of free wheels.

The flexural spring assembly may also have an uneven number of flexural springs per axle-box and, depending on the available space, an uneven number of leaf springs may therefore also overlap or engage beneath an axle-box.

In addition it is also possible to arrange several leaf springs in one plane next to one another. Here, in order to influence the lateral stiffness of the flexural spring assembly at right-angles to the direction of running of the running gear, it is expedient to slot at least one of the leaf springs, at least in the sprung area in the longitudinal direction, i.e. in the area between axle-boxes and a cross-member structure connecting the two parallel flexural spring assemblies.

The overall result is therefore a running gear for a rail vehicle which, in addition to a running gear frame which can be produced in one piece and which simultaneously provides the primary suspension, also ensures considerably enhanced stability of the axle guidance, which is realized through the symmetrical mounting of the axle boxes between several flexural springs, which facilitates a largely moment-free initiation of force. At the same time, the several flexural springs are more readily adapted to meet the particular requirements of operation and bring about a significant improvement in the vertical resilience of the overall assembly, making additional external spring components unnecessary.

The invention is described in detail below with the aid of the basic drawings of an embodiment.

DETAILED DESCRIPTION OF THE PREFERRED EMBODIMENT

Figure 1:
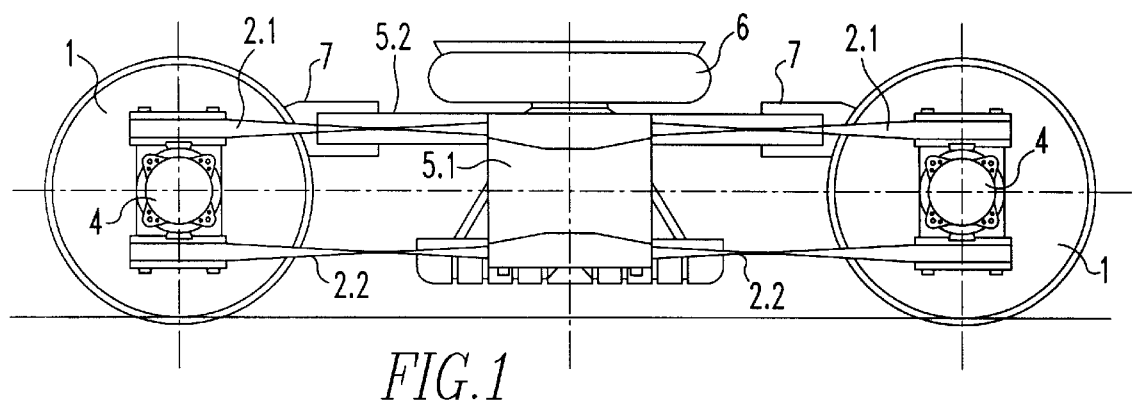
FIG. 1 is a side view of a two-axle running gear in the form of a bogie.
Figure 2:
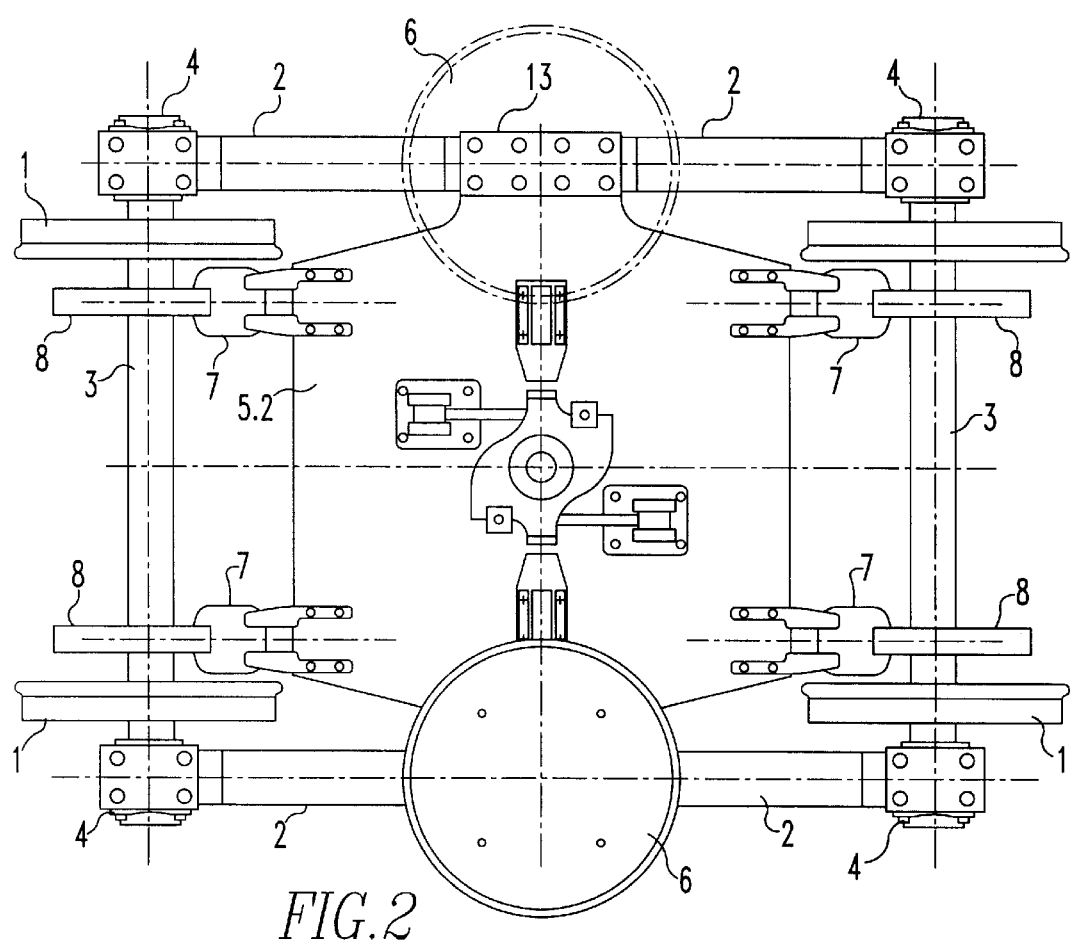
FIG. 2 is a plan view of the running gear according to FIG. 1.

A running gear frame for a rail vehicle has longitudinal members 2 running outside rail wheels 1 and aligned in the direction of running. In each case two of the four rail wheels 1 have as their axle a common axle 3 running at right-angles to the direction of running. The associated, externally-mounted axle-boxes 4 support the axles 3 and are in turn connected to the associated end of the respectively-adjacent longitudinal member. The longitudinal members 2 are connected to one another in the area of their longitudinal centre, preferably rigidly, by a cross-member structure 5. At the connection points between cross-member structure 5 and longitudinal members 2 there is in each case a secondary spring 6, which is in particular a pneumatic or solid rubber spring with relatively high lateral stiffness.

The longitudinal members 2 are made of elastic, fibre-reinforced plastic and simultaneously provide on account of their elasticity, in addition to the guidance of the two wheelsets, the necessary suspension between the wheelsets and the running gear frame. Here at least the end sections of the longitudinal members are in the form of flexural springs. In order to obtain at the same time a symmetrical flow of forces and a high level of reliability, the longitudinal members are each comprised of at least two flexural springs, with one axle-box fixed between their associated ends in each case.

According to FIG. 1, each axle-box 4 is mounted between two flexural springs 2.1 and 2.2 arranged above one another with clearance. At the same time the flexural springs 2.1 and 2.2 run parallel to one another in the horizontal direction, with this position corresponding to the normal load case when the vehicle body is mounted on the primary suspension elements. In the unloaded production state, these flexural springs 2.1 and 2.2 may be swung flat and S-shaped, so that their free ends are then deflected somewhat downwards in the direction of running.

Figure 3:
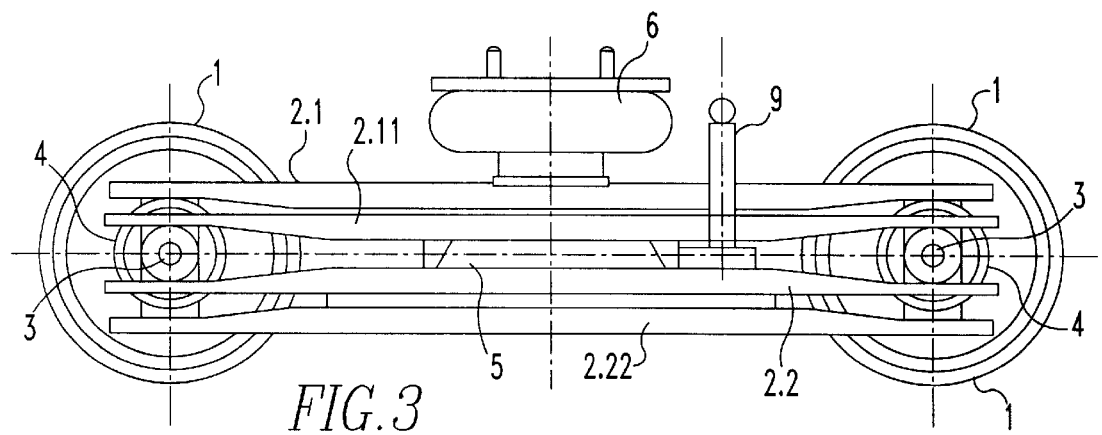
FIG. 3 is a side view of a modified running gear.

In the variant shown in FIG. 3, the longitudinal members are formed by four flexural springs 2.1, 2.11, 2.2 and 2.22, arranged vertically above one another with space between them. In each case two flexural springs 2.1 and 2.11 lie above the plane joining the axles 3 of the wheels 1, and the other two lie below this plane. At the same time the upper flexural springs 2.1 and 2.11 overlap the respective axle-box 4, while the other flexural springs 2.2 and 2.22 engage beneath it. All ends of the flexural springs are also mechanically coupled to the associated axle-box 4. The individual flexural springs extend from one front axle-box to the axle-box of the other wheelset on the same side.

The cross-member structure 5 has a cross-member 5.1 mounted in the centre and running at right-angles to the direction of running. This is covered by a plate-shaped frame reinforcing element 5.2. The frame reinforcing element 5.2 connects the longitudinal members 2 independently of the cross-members. This frame reinforcing element 5.2 is mounted centrally and horizontally between the longitudinal members and the axles 3 of the front and rear wheelsets, and carries brake calipers 7 of disc brakes, the brake discs 8 of which are fastened to the axles 3 of the wheelsets.

All flexural springs 2.1 through 2.22 are rigidly connected to one another in the area of the cross-member structure 5. They may also in particular be made rigid and integral with the cross-member structure and here preferably at least with the cross-member 5.1. The bogie frame can thus be manufactured in one operation with its longitudinal members 2 in the form of flexural springs and at least its cross-member 5.1 and where applicable also its frame reinforcing element 5.2. At the same time a bogie pivot assembly 9 may also be attached to the running gear frame, to provide a non-positive connection between the running gear in the form of a bogie and the vehicle body mounted thereon.

Figure 4:
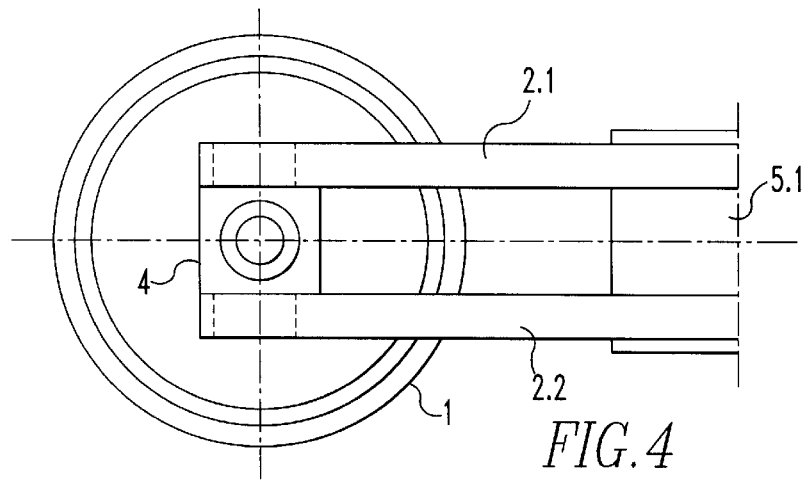
FIG. 4 is a rigid fastening to an axle-box.

In accordance with FIG. 4 the axle-box 4 is directly and inelastically connected to the associated ends of the flexural springs 2.1 and 2.2. This results in the creation of an S-shaped deflection curve. The cost of fitting is minimal. Moreover, there are no wearing parts, so that only limited maintenance expenditure is necessary. In addition this design is expedient when a comparatively stiff spring characteristic is desired.

Figure 5:
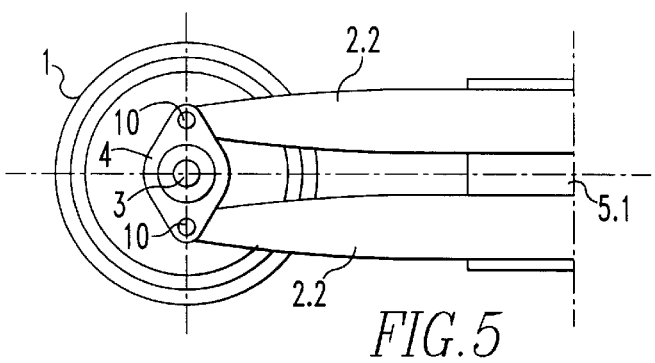
FIG. 5 is a pivoted coupling of flexural springs to an axle-box.

A modified connection between axle-box 4 and the associated ends of the flexural springs 2.1 and 2.2 is shown in FIG. 5. Here the free ends of the flexural springs 2.1 and 2.2 are each connected to the axle-box 4 via swivel journals 10, which run parallel to the axle 3 and are pivoted at the housing of the axle-box 4 in a vertical plane which includes the axle 3, symmetrical to the latter and with clearance from it. This produces a deflection curve of the kind found in cantilever beams. At the same time the wheelset housing may be replaced very easily, since only the swivel journals have to be removed and refitted.

Figure 6:
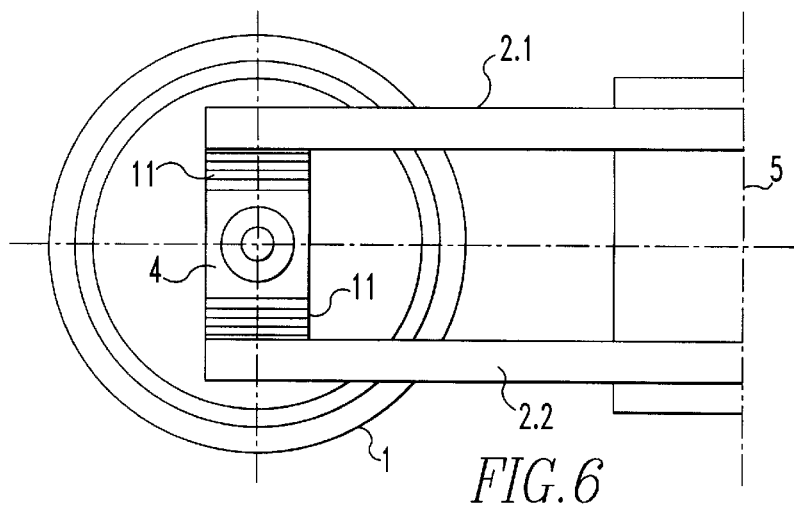
FIG. 6 is an elastic coupling of flexural springs to an axle-box.

An elastic connection, flexible in shear, between each axle-box 4 and the associated flexural springs 2.1 and 2.2 is shown in FIG. 6. This involves in each case the insertion between the axle-box 4 and the ends of the flexural springs 2.1 and 2.2 of a rubber-elastic connection element 11, which damps impacts and vibrations occurring in particular in the direction of running, thereby contributing to a smooth ride of the whole running gear. Here the deflection curve may be varied by varying the stiffness of the elastic connection element 11 from an S-shaped design (rigid connection element) up to the characteristic of cantilever beam bending (relatively flexible connection element).

In addition the two wheelsets may also be guided in transversely-elastic axle-boxes, in order to transmit lateral oscillations elastically to the running gear frame. The damping of lateral oscillations may also be effected using rubber-elastic elements between the axle-box 4 and leaf springs. Also, for noise damping, damper elements may be integrated in the flexural springs to dampen free vibrations. Here it is expedient to support such damper elements at one end on the axle-boxes 4 and at the other end on the cross-member structure 5, if the flexural springs 2.1–2.22 are intended to be uninfluenced by such damping elements. Moreover a slip coupling may be inserted in the axle of one or more wheelsets, in order to give the relevant wheels 1 the operating characteristic of a pair of free wheels.

Figure 7:
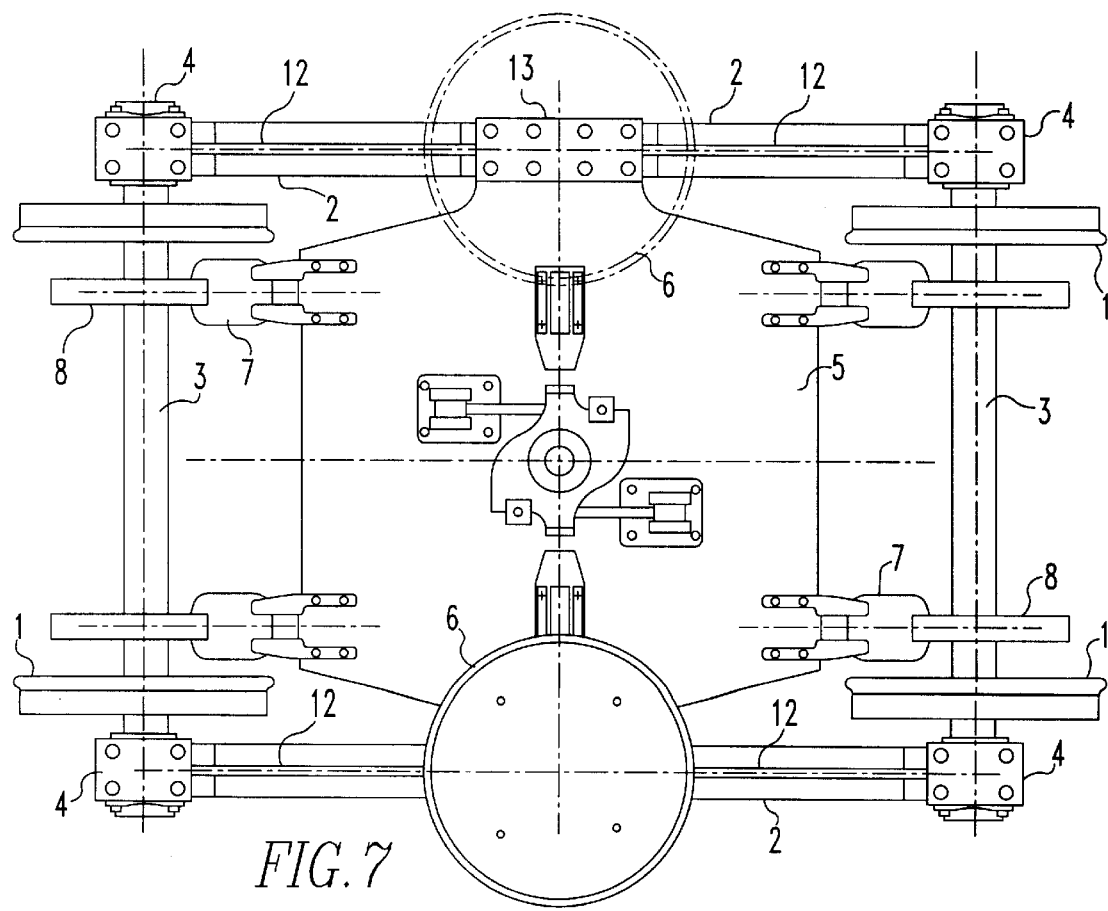
FIG. 7 is a plan view of a running gear with longitudinally-slotted flexural springs.

It has proved to be expedient to provide one, several or even all flexural springs in accordance with FIG. 7, with the design otherwise unchanged, with a longitudinal slot 12 running in their longitudinal direction, and extending in particular between the respective axle-box 4 and the respective connection point 13 with the cross-member structure 5. This influences the spring characteristic and provides scope for varying the lateral stiffness of the spring assembly. Here the length of the slot 12 may be limited to only part of the spring length.

To simplify manufacture it is of advantage here to join together in one piece at least those flexural springs in one longitudinal alignment, thereby facilitating the permanent link with the cross-member structure in the area of the connection point 13.

What is claimed is:

1. A running gear for a rail vehicle comprising:
   a plurality of elastic sprung longitudinal members connected to one another by means of a cross-member, wherein free ends of the longitudinal members are connected to axle-boxes for rail wheels each of the longitudinal members has at least two flexural springs at the free ends to which the axle-boxes are fixed, and at least one flexural spring has a slot in a sprung area between the axle-box and the cross-member structure.

2. The running gear according to claim 1, further including damper elements incorporated in the flexural springs at the free ends to which the axle-boxes are fixed.

3. The running gear according to claim 1 wherein each axle-box is fixed between ends of flexural springs.

4. The running gear according to claim 1 wherein the at least two flexural springs of each longitudinal member are arranged either spatially above or adjacent to one another.

5. The running gear according to claim 1 wherein each longitudinal member has four flexural springs arranged either above or adjacent to one another, with at least two adjacent ends of the springs engaging beneath one of the axle-boxes and further associated ends overlapping the one axle-box.

6. The running gear according to claim 5 wherein the four flexural springs are vertically spaced from each other.

7. The running gear according to claim 1 wherein the flexural springs are rigidly connected to one another in the area of the cross-member structure.

8. The running gear according to claim 1 wherein the flexural springs are rigidly connected to the cross-member structure.

9. The running gear according to claim 1 wherein the longitudinal members coupled to one another by means of an additional, horizontally-positioned frame reinforcing element.

10. The running gear according to claim 9 wherein the frame reinforcing element is located centrally and the rail vehicle has at least one of wheel brake equipment or a central bogie pivot assembly for a vehicle body to be mounted thereon.

11. The running gear according to claim 10 wherein the frame reinforcing element is located centrally and the rail vehicle carries the central bogie pivot assembly for the vehicle body to be mounted thereon.

12. The running gear according to claim 1 wherein associated ends of the flexural springs are pivotally mounted and are flexible in shear on or in the associated axle-box case.

13. The running gear according to claim 1 wherein the ends of the flexural springs are rigidly fastened to an associated axle-box case.

14. The running gear according to claim 1 wherein the ends of the flexural springs are linked to a case of the associated axle-box by means of swivel journals having axes which run parallel to the wheel axle.

15. The running gear according to claim 1 wherein the sprung longitudinal members are plastic.

16. The running gear according to claim 15 wherein the seprung longitudinal members are fibre-reinforced plastic.

17. A running gear for a rail vehicle comprising:
    a plurality of elastic sprung longitudinal members connected to one another by means of a cross-member, wherein free ends of the longitudinal members connected to axle-boxes for rail wheels, each of the longitudinal members has at least two flexural springs at the free ends to which the axle-boxes are fixed, and in an unloaded state the flexural springs are deflected downwards from the cross-member structure in an S-shape.

18. A running gear for a rail vehicle comprising:
    a plurality of elastic sprung longitudinal members connected to one another by means of a cross-member and wheelsets guided in transversely elastic axle-boxes, wherein free ends of the longitudinal members are connected to axle-boxes for rail wheels and each of the longitudinal members has at least two flexural springs at the free ends to which the axle-boxes are fixed.

19. The running gear according to claim 18 further comprising damper elements incorporated in the flexural springs.

20. A running gear for a rail vehicle comprising:
    a plurality of elastic sprung longitudinal members connected to one another by means of a cross-member and damper elements arranged between the axle-box and the cross-member structure, wherein free ends of the longitudinal members are connected to axle-boxes for rail wheels and each of the longitudinal members has at least two flexural springs at the free ends to which the axle-boxes are fixed.

21. The running gear according to claim 1 further comprising a slip coupling, wherein the slip coupling is inserted into the axle of one or more wheelsets.

* * * * *

UNITED STATES PATENT AND TRADEMARK OFFICE
CERTIFICATE OF CORRECTION

PATENT NO. : 6,250,232 B1
DATED : June 26, 2001
INVENTOR(S) : Ulrich Hachmann et al.

It is certified that error appears in the above-identified patent and that said Letters Patent is hereby corrected as shown below:

<u>Column 1,</u>
Line 9, after "kind," insert -- as disclosed in --.
Line 10, after "A1" insert comma (,).
Line 12, before "made" delete "is".

<u>Column 2,</u>
Lines 61-62, delete "The invention is described in detail below with the aid of the basic drawings of an embodiment."

Signed and Sealed this

Ninth Day of April, 2002

Attest:

*Attesting Officer*

JAMES E. ROGAN
*Director of the United States Patent and Trademark Office*